United States Patent [19]

Mahling et al.

[11] Patent Number: 5,108,528
[45] Date of Patent: Apr. 28, 1992

[54] METHOD FOR BONDING A CARCASS FOR A TUBED TIRE WITH A BELT BAND

[75] Inventors: Rolf Mahling, Korbach; Thomas Peter, Twistetal, both of Fed. Rep. of Germany

[73] Assignee: Continental Aktiengesellschaft, Hanover, Fed. Rep. of Germany

[21] Appl. No.: 488,514

[22] Filed: Feb. 27, 1990

[30] Foreign Application Priority Data

Feb. 27, 1989 [DE] Fed. Rep. of Germany ....... 3906046

[51] Int. Cl.⁵ .......................... B29D 30/06; B60C 3/02
[52] U.S. Cl. ..................................... 156/121; 152/453; 156/118; 156/130.500
[58] Field of Search ............ 156/118, 121, 123, 130.5, 156/421.6; 152/453, 501, 513–515

[56] References Cited

U.S. PATENT DOCUMENTS 4,585,044  4/1986  Carrera et al. ...................... 152/453
4,709,739  12/1987  Ruscelli et al. ...................... 152/453

FOREIGN PATENT DOCUMENTS 519249  3/1955  Italy .................................... 152/453

Primary Examiner—Geoffrey L. Knable
Attorney, Agent, or Firm—Robert W. Becker & Associates

[57] ABSTRACT

A method and apparatus for bonding a carcass for a tubed tire with a belt band that protects the radially inner side of the tire. The bonding surface is coated with a rubber solution, the belt band is placed thereon, and the bonding zone of tire and belt band is vulcanized. To achieve an increased resistance to separation between a biased carcass and a belt band, the zenith portion of the tire is reinforced with additional or overlapping plies in such a way that the rigidity of the outer half in the circumferential direction is greater than that of the inner half. While avoiding high speed accelerators, the rubber solution is provided with such a quantity of polymerizing agent that at the selected vulcanization temperature a vulcanizing time of between a third of a minute and ten minutes results. The tire, which is provided with the belt band and is in a position of use, is disposed onto a ring that is provided with a circumferential trough and is heated. The tire is inflated to shrink its circumference and to compress the bond that is to be vulcanized with the belt band.

2 Claims, 1 Drawing Sheet

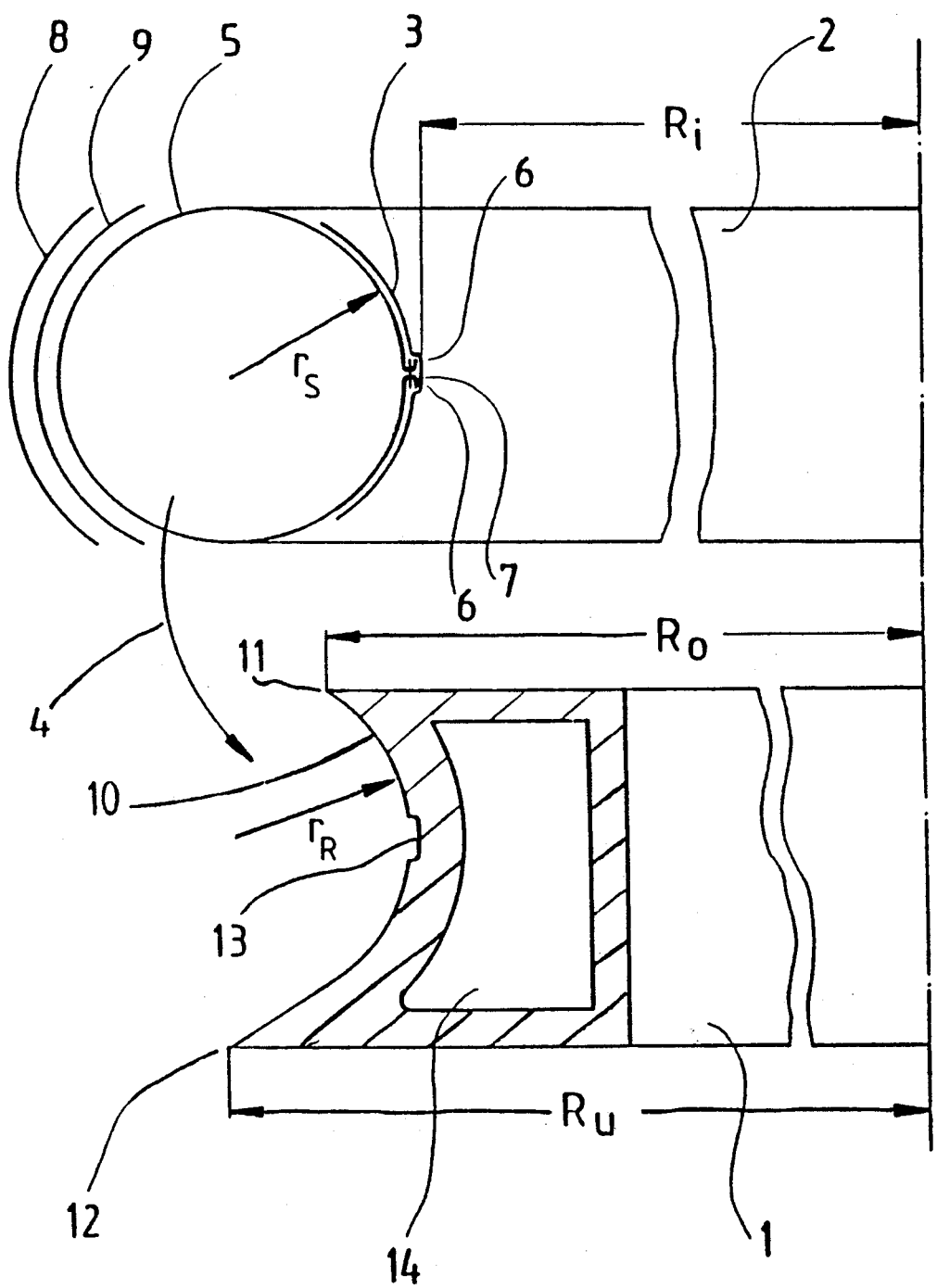

METHOD FOR BONDING A CARCASS FOR A TUBED TIRE WITH A BELT BAND

BACKGROUND OF THE INVENTION

The present invention relates to a method and apparatus for bonding a carcass for a tubed tire with a belt band that protects the radially inner side of the tubed tire, with the method including coating the bonding surface with a rubber solution, placing the belt band thereon, and subsequently vulcanizing the bonding zone of tubed tire and belt band.

A natural rubber solution is generally used as the rubber solution. In this connection, the bonding surface of not only the carcass but also of the belt band itself that is to be placed thereagainst is coated six to twenty times, depending upon the embodiment. After the bonding surface has been made tacky in this manner, the belt band is pressed for a short period of time against the carcass. The vulcanization is effected at room temperature, and requires approximately three weeks to three months. Thus, the predominant portion of the polymerization is achieved during a free or natural vulcanization.

In addition to the very long vulcanization time, the heretofore known method has the drawback that the belt band, which is intended to protect the tubed tire from wear resulting from the rim, is not seated securely enough on the carcass to reliably prevent separation of the belt band during high stress, as occasionally occurs, for example, during bicycle races.

It is therefore an object of the present invention to provide a method for bonding a tubed tire carcass with a belt band that provides a considerably greater resistance to separation between the belt band and the carcass.

BRIEF DESCRIPTION OF THE DRAWING

This object, and other objects and advantages of the present invention, will appear more clearly from the following specification in conjunction with the accompanying schematic drawing, which shows one exemplary embodiment of the inventive method for carrying out the method of the present invention.

SUMMARY OF THE INVENTION

The method of the present invention includes the steps of: reinforcing the zenith portion of the tubed tire with additional or overlapping plies in such a way that the rigidity of the outer half in the circumferential direction is greater than the rigidity of the inner half; providing the rubber solution, while avoiding high speed accelerators, with such a quantity of polymerizing agent that at a selected vulcanization temperature a vulcanizing time results that is between a third of a minute and ten minutes; disposing the tubed tire, which is provided with the belt band and is in a position of use, onto a ring that is provided with a circumferential trough and is heated; and inflating the tubed tire to shrink its circumference and to compress the bond that is to be vulcanized with the belt band.

Due to the fact that the pressure is maintained during the entire vulcanization time, a higher degree of polymerization, and a considerably higher resistance against separation, are achieved. Pursuant to the present invention, in order to build up pressure in the bonding surface it is not necessary to have an outer ring that resembles the rim-like heating ring; rather, the biased carcass, by being inflated, is itself the pressing mechanism. This is accomplished due to the phenomenon that the biased carcass for tubed tires, due to its subcritical thread angle (40° to 45°), has its inner diameter reduced as the pressure is increase. The simultaneous use of the workpiece carcass as a tool mechanism saves not only the cost for an outer ring, but also makes it possible to have a particularly uniform distribution of pressure over the periphery.

The profile of a tubed tire exhibits a nonuniform distribution of rigidity. The seam which is generally disposed on the inner side, and which is closed after introduction of the airtight tube, has a greater rigidity than the surrounding non-seamed carcass zones due to the folded-over carcass portions that are required to form the seam. Pursuant to the first characteristic of the inventive method, the tubed tire is reinforced radially outwardly at least to such an extent that its outer half, in the circumferential direction, is slightly more rigid than is its inner half. As a result, the phenomenon observed with most tubed tires, namely that during shrinkage or contraction the tubed tire twists, is avoided. This results in a more reliable seating of the tire in the heating ring.

The tubed tire is preferably first forced into such a transposed position that that side that in the position of use is disposed inwardly, is disposed outwardly. In this inverted position, after the bonding surface is made tacky, the belt band is placed thereon. The tire is then again placed in its position of use and is disposed on the heating ring. The heating ring and its trough, onto which the tubed tire is disposed, is preferably heated to a temperature of between 120° and 210° C.

For this purpose, the heating ring preferably has a hollow chamber. Utilizing this hollow chamber, the ring can be heated by conveying a gas or a hot liquid through the hollow chamber, or by disposing electrical heating elements in the hollow chamber. Considerably shorter vulcanization times are achieved due to the fact that the vulcanization is now effected at considerably higher temperatures than the room temperature that was up to now used for this purpose. These short vulcanization times make it possible for the first time to keep the bonding surface under pressure during the entire vulcanization time, which has been shortened from the previous length of several months to a time interval that is measured in just a few minutes; this pressure is in contrast to the essentially natural vulcanization of the heretofore known method. Pursuant to the present invention, the high speed accelerator, for example thiuram or dithiocarbamate, which is extremely toxic due to the release of nitrosoamine, is unnecessary.

Pursuant to the present invention, the bonding surface between the belt band and the tubed tire carcass is preferably coated only one time with rubber solution prior to the placement of the belt band thereon. Advantageously both the bonding surface on the side of the carcass as well as the bonding surface on the side of the belt band are coated one time. This one-time coating is sufficient because due to the reliable application of pressure, the rubber solution per application can be coated considerably thicker than was previously known in the state of the art. As a result of coating both the carcass and the belt band one time, a particularly good initial tackiness is achieved that facilitates the manufacture.

The heated ring on which the tubed tire that is provided with the belt band is to be heated up, is advantageously disposed essentially horizontally. The lowermost of the two flanges that delimit the trough of the ring preferably has a greater outer diameter than does the upper flange. This larger lower flange prevents the tire from falling through in a downward direction and at the same time serves as a centering aid. This arrangement permits the tubed tire to be mounted particularly rapidly on the ring, and prevents localized overheating.

It is particularly advantageous to provide a somewhat hotter location on the heating ring, and to position the tubed tire valve at this location. The increased heat requirement at this location is then completely compensated for by the increased temperature, and provides a uniform degree of vulcanization over the periphery. If the heating ring is to be heated by conveying a hot medium therethrough, the hottest location is disposed in the vicinity of the inlet of the heating medium. Thus, the tubed tire valve should be positioned at this location.

As indicated previously, most tubed tires have a seam. This seam involves a widened portion. In order nonetheless to achieve a uniform pressure against the belt band that is to be bonded, it is proposed pursuant to the present invention that the heated ring, which has a trough that is delimited by two flanges, be provided at the deepest location of the trough with a narrow groove for receiving the carcass seam and the folded-over portions of the tubed tire that are necessary for forming the seam.

It is to be understood that the transverse radius of curvature of the trough in the heating ring should correspond approximately to the transverse radius of the tubed tire that is to be treated. In order to achieve a particularly high pressure against the edges of the belt band, which are particularly subjected to the danger of separation, it is advisable that the transverse radius of the groove be slightly less than the transverse radius of the tubed tire, preferably being 92 to 98% thereof.

Further specific features of the present invention will be described in detail subsequently.

DESCRIPTION OF PREFERRED EMBODIMENTS

Referring now to the drawing in detail, shown is a heated ring 1 onto which the tubed tire 2 is to be disposed, via the axial movement indicated by the arrow 4, for the vulcanization of the bond with the belt band 3.

The tubed tire is illustrated in only a very diagrammatic manner, showing its two-ply biased carcass 5 which, after the introduction of a nonillustrated tube, is closed off radially inwardly, accompanied by the formation of folded-over portions 6, via a seam 7. The thread angles in the carcass plies are 43°, so that with an increase in the inflation pressure, the inner radius $R_i$ of the tubed tire is reduced. Provided in the zenith portion between the tread strip 8 and the carcass 5 is a two-ply, belt-like reinforcing strip 9. This reinforcing strip serves not only to increase the resistance against penetration, i.e. a reduction of the risk of a blowout or flat tire, but also affects the rigidity distribution such that the radially outer half is more rigid in the circumferential direction than is the inner half.

The heated ring 1 is provided with a trough 10 that is delimited at the top by a flange 11 of maximum radius $R_o$, and is delimited at the bottom by a larger flange 12 of maximum radius $R_u$, with $R_o$ being slightly greater than $R_i$, so that the tubed tire 2 "snaps" into position in the trough 10. The larger flange 12 has a conical configuration, prevents the tubed tire 2 from falling through toward the bottom, and facilitates orientation of the tire 2 on the heated ring 1. At its deepest location, the trough 10 is provided with a circumferential groove 13 for accommodating the seam 7 and the folded-over portions 6 of the carcass 5 of the tubed tire 2. This permits the belt band 3 to be pressed particularly uniformly against the inner side of the tire 2. For most applications, it is expedient for the belt band to contain load-carrying cords in a known manner; however, this is not absolutely necessary.

The rim-like heating ring 1 is provided with a hollow chamber 14 via which the ring is heated. The configuration shown in the illustrated embodiment is based on heating the ring by conveying steam therethrough. It is to be understood that other heating principles could also be utilized.

The invention provides an improved method for heating belt bands on tubed tires. In addition, the present invention discloses a suitable apparatus for carrying out this method. While providing for a rapid production sequence, the inventive method provides for an increased resistance to separation between the biased carcass and the belt band.

The present invention is, of course, in no way restricted to the specific disclosure of the specification and drawing, but also encompasses any modifications within the scope of the appended claims.

What we claim is:

1. In a method for bonding a carcass for a tubed tire with a belt band that protects the radially inner side of said tire, on which inner side a carcass seam of said tubed tire is located, said method including coating bonding surfaces of said carcass and said belt band with a rubber solution, placing said belt band against said carcass, and subsequently vulcanizing the bonding zone of tubed tire and belt band, the improvement including the steps of:

reinforcing the zenith portion of said tubed tire with additional plies in such a way that the rigidity of a radially outer half of said tire, in a circumferential direction, is greater than the rigidity of a radially inner half of said tire;

providing said rubber solution, while avoiding high speed accelerators, with such a quantity of polymerizing agent that at a selected vulcanization temperature a vulcanizing time results that is between a third of a minute and ten minutes;

disposing said tube tire, which is provided with said belt band and is in a position of use, onto a ring that is provided with a circumferential trough and is heated, with said belt band and said carcass seam facing said ring; and inflating said tubed tire to shrink its inner circumference and to compress said bonding zone of tubed tire and belt band that is to be vulcanized; and arranging said heated ring, on which said tubed tire that is provided with said belt band is to be disposed, essentially horizontally, with said trough of said ring being delimited by a lower flange and an upper flange, whereby said tire is prevented from falling through and is centered by providing said lower flange with a greater radius than said upper flange.

2. In a method for bonding a carcass for a tubed tire with a belt band that protects the radially inner side of said tire, on which inner side a carcass seam of said tubed tire is located, said method including coating bonding surfaces of said carcass and said belt band with a rubber solution, placing said belt band against said carcass, and subsequently vulcanizing the bonding zone of tubed tire and belt band, the improvement including the steps of:

reinforcing the zenith portion of said tubed tire with additional plies in such a way that the rigidity of a radially outer half of said tire, in a circumferential direction, is greater than the rigidity of a radially inner half of said tire;

providing said rubber solution, while avoiding high speed accelerators, with such a quantity of polymerizing agent that at a selected vulcanization temperature a vulcanizing time results that is between a third of a minute and ten minutes;

disposing said tube tire, which is provided with said belt band and is in a position of use, onto a ring that is provided with a circumferential trough and is heated, with said belt band and said carcass seam facing said ring; and inflating said tubed tire to shrink its inner circumference and to compress said bonding zone of tubed tire and belt band that is to be vulcanized; and in which said disposing step comprises disposing said tube tire onto said ring that is provided with said circumferential through having a transverse radius of curvature that is equal to 92 to 98% of the transverse radius of the tubed tire.

* * * * *